(12) United States Patent
Silberberg

(10) Patent No.: US 9,551,574 B2
(45) Date of Patent: Jan. 24, 2017

(54) PLUMBER'S LEVEL

(71) Applicant: Mark L. Silberberg, Fallbrook, CA (US)

(72) Inventor: Mark L. Silberberg, Fallbrook, CA (US)

( * ) Notice: Subject to any disclaimer, the term of this patent is extended or adjusted under 35 U.S.C. 154(b) by 147 days.

(21) Appl. No.: 14/515,834

(22) Filed: Oct. 16, 2014

(65) Prior Publication Data

US 2016/0109234 A1    Apr. 21, 2016

(51) Int. Cl.
*G01C 9/34*    (2006.01)
*G01C 9/28*    (2006.01)

(52) U.S. Cl.
CPC .. *G01C 9/34* (2013.01); *G01C 9/28* (2013.01)

(58) Field of Classification Search
CPC ..................... G01C 9/24; G01C 9/34
USPC ..................... 33/370, 371
See application file for complete search history.

(56) References Cited

U.S. PATENT DOCUMENTS

| | | | | |
|---|---|---|---|---|
| 4,295,279 A * | 10/1981 | Sienknecht | ............ | G01C 9/28 33/373 |
| 4,580,350 A * | 4/1986 | Fincher | ............ | G01C 9/28 33/334 |
| 5,154,000 A * | 10/1992 | Mahoney | ............ | B21D 7/14 33/343 |
| 5,996,238 A * | 12/1999 | Yonke | ............ | G01C 9/28 33/371 |
| 6,098,300 A * | 8/2000 | Angelucci | ............ | G01C 9/26 33/379 |
| 6,131,298 A * | 10/2000 | McKinney | ............ | G01C 9/28 33/370 |
| 6,752,370 B2 * | 6/2004 | Gonzales | ............ | E01C 19/506 33/371 |
| 6,918,187 B2 * | 7/2005 | Schaefer | ............ | G01C 9/26 33/365 |
| 7,117,606 B2 * | 10/2006 | Brown | ............ | G01C 9/28 33/365 |
| 7,536,798 B2 * | 5/2009 | Silberberg | ............ | G01C 9/28 33/379 |
| 8,484,856 B1 * | 7/2013 | Webb | ............ | G01C 9/26 33/371 |
| D723,954 S * | 3/2015 | Christianson | ............ | G01C 9/18 D10/69 |
| 9,228,832 B2 * | 1/2016 | Steele | ............ | H02G 1/00 |
| 2002/0174553 A1 * | 11/2002 | Dolezal | ............ | G01C 9/28 33/373 |
| 2003/0009897 A1 * | 1/2003 | Gonzales | ............ | E01C 19/506 33/645 |
| 2007/0245580 A1 * | 10/2007 | Jelinek | ............ | G01C 9/18 33/372 |
| 2015/0096182 A1 * | 4/2015 | Silberberg | ............ | G01C 9/36 33/381 |

* cited by examiner

*Primary Examiner* — Yartiza Guadalupe-McCall

(57) ABSTRACT

A spirit type level that may be used to plumb any vertical pole or post, may be used to horizontally set an object and may also be used to quickly and easily set a pipe at a selected slope of between 0 and 3 percent. The spirit type level of the invention includes a plurality of differently oriented spirit vials that are secured within the level body in a manner such that, if any one of the spirit vials become broken, or otherwise damaged, it can be easily replaced and the level need not be discarded. The spirit type level of the invention can be quickly and easily removably attached to the object to be leveled thereby freeing the hands of the user to position the object.

20 Claims, 4 Drawing Sheets

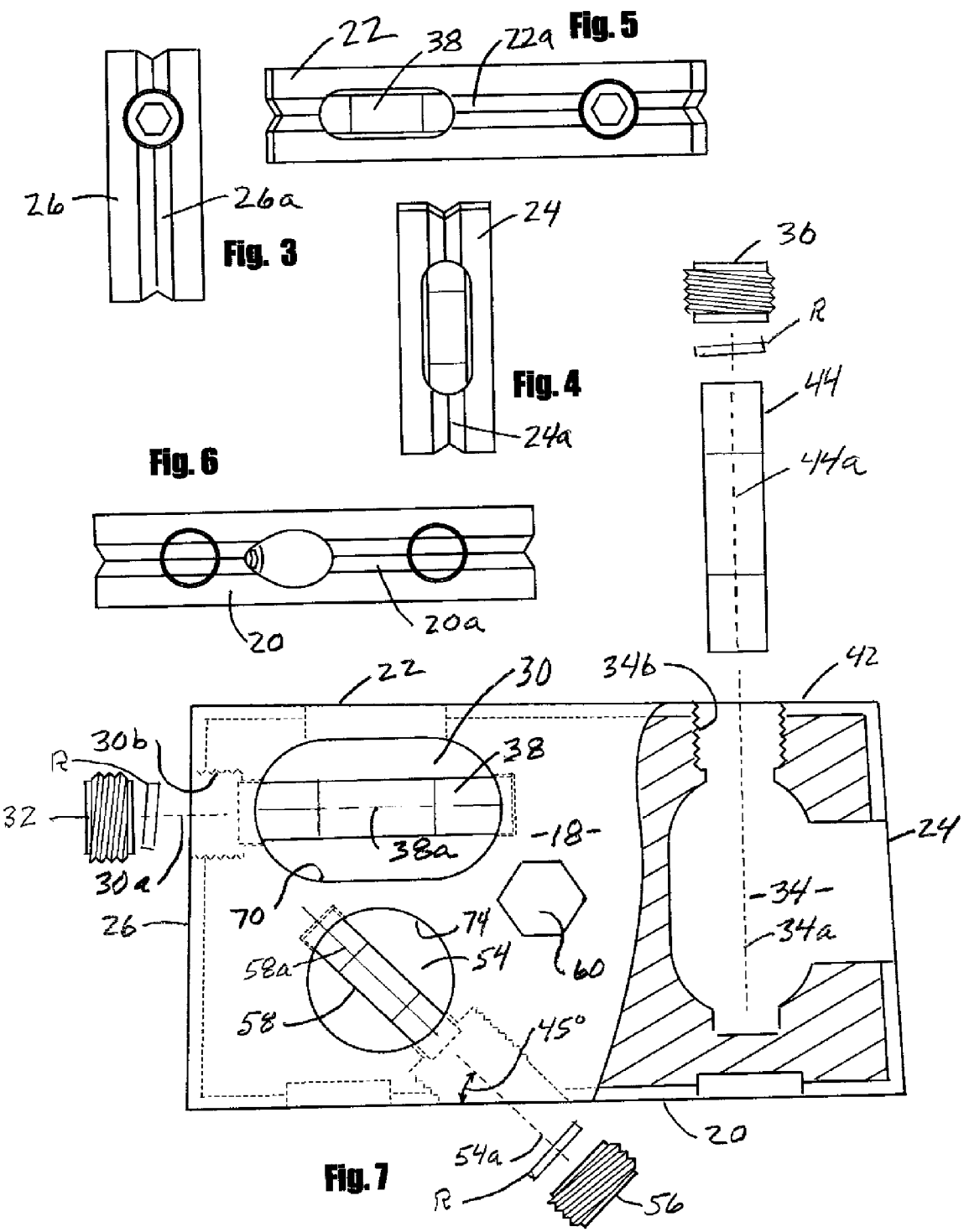

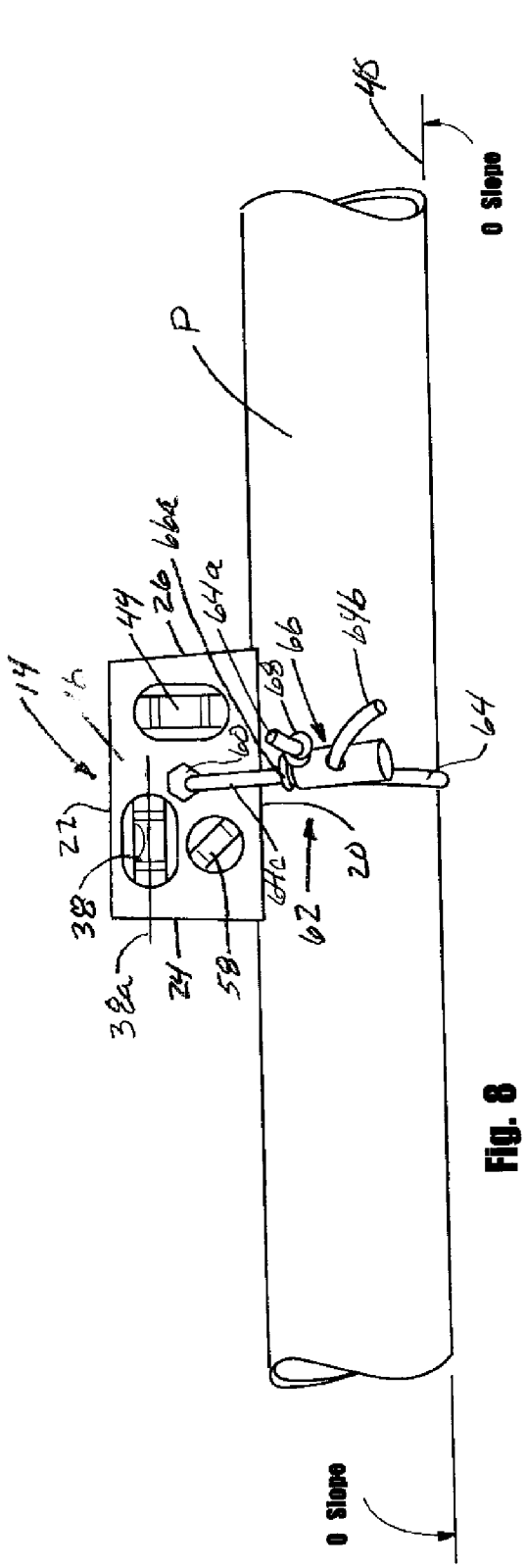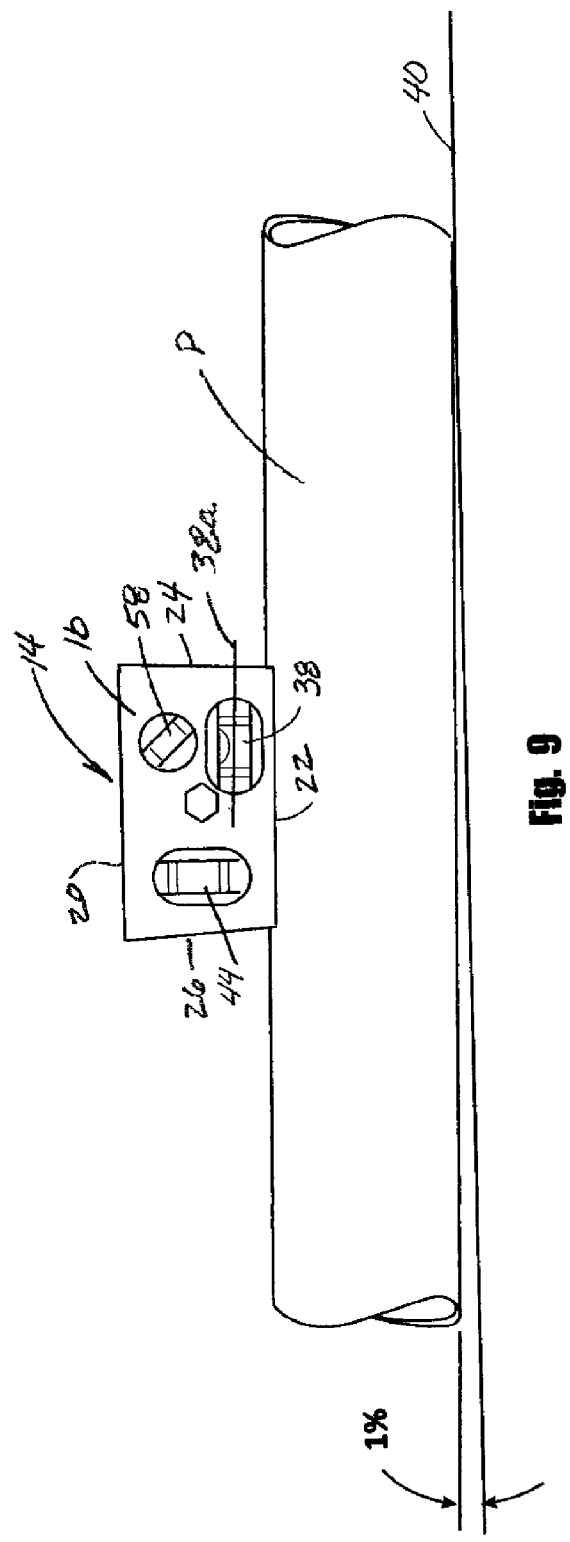

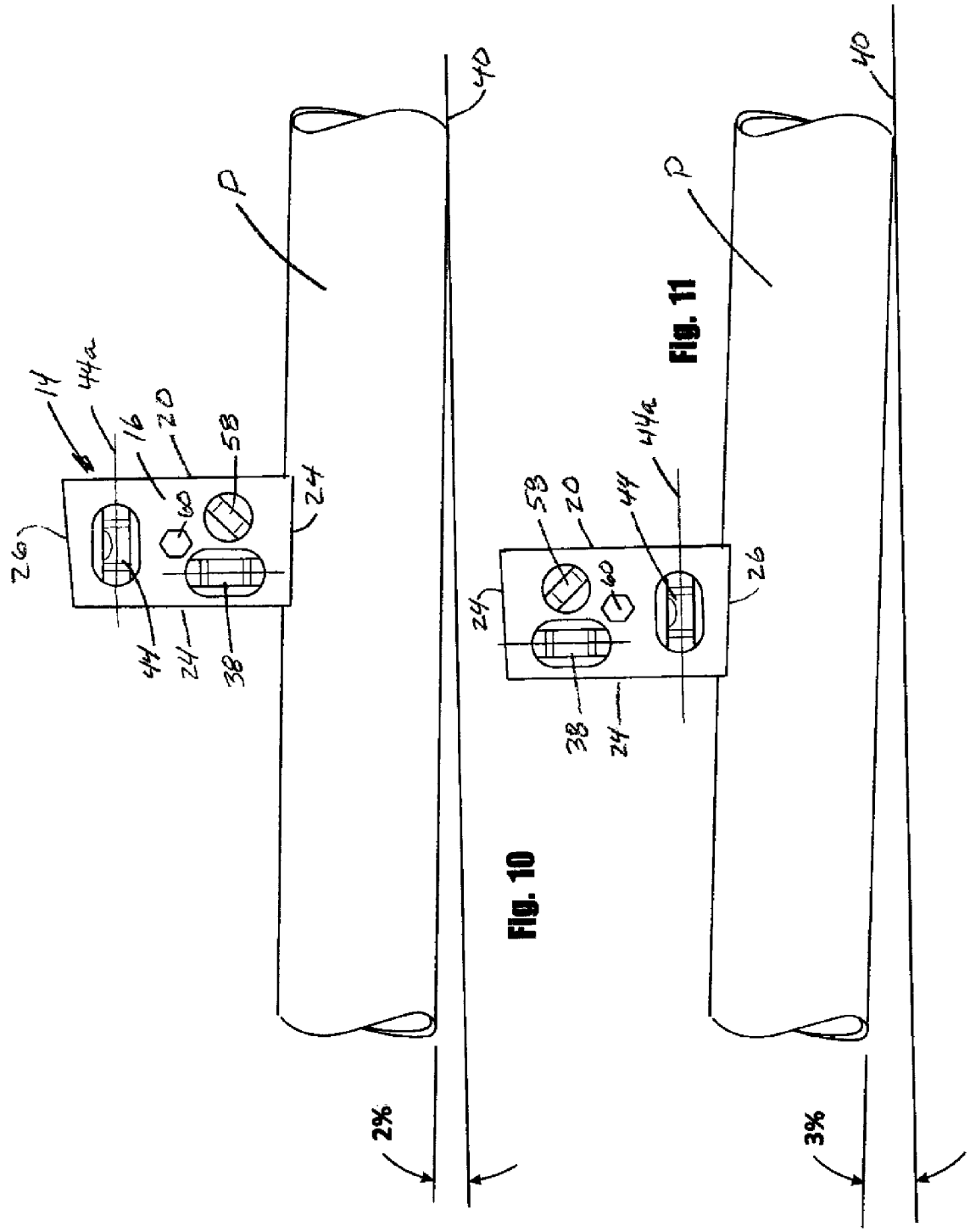

PLUMBER'S LEVEL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to tools used in the construction industry. More particularly, the invention concerns a specially designed spirit level for use by plumbers having replaceable spirit vials and including a novel connector mechanism for releasably connecting the level to the structure to be leveled.

2. Discussion of the Prior Art

Spirit levels of various designs have been suggested in the past and are widely used by construction workers to determine the orientation of a particular structure or surface with respect to a reference axis. A typical spirit level generally comprises an elongated body that has a pair of opposing, generally parallel working surfaces and includes a plurality of openings having spirit vials permanently secured therein. The spirit vials are typically aligned in different directions relative to the working surfaces and function to indicate the orientation of a structure. For example, one vial may be aligned in a direction perpendicular to the working surfaces, another may be aligned in a direction parallel to the working surfaces and a third may be aligned in an angular direction. Typically, the vial contains a fluid and a spirit, and the user views the position of the spirit within the vial to determine the position of the tool relative to the working surfaces.

A novel and highly useful level construction is disclosed in U.S. Pat. No. 7,536,798 issued to the present inventor. This patent, which is entitled "Multiple Angle Compact Spirit Level", describes a level with a generally U-shaped or round, rigid frame. The outer surface of the level is comprised of a number of planar reference faces that are at different fixed angles with respect to the spirit vial mounted within the frame Another useful level construction is disclosed in U.S. Pat. No. 7,802,372 also issued to the present inventor. This patent, which is entitled "Removable Laser Base Attachment for Spirit Levels", describes a spirit level that includes a body, a laser beam generator, and a removable securement. The body has a flat top surface that the level is secured to and a bottom surface that is flat and parallel to the top surface. A laser diode mounted in a module emits a visible laser beam upon application of power from a battery that is controlled by a switch. The module, batteries, and switch are mounted in a through bore in the body. The laser base is removably secured to the spirit level by any manner appropriate to the shape of the level. In one such securement, the level has a T-shaped cross-section and the body has a complementary slot into which the level slides. When the level reference surface abuts the top surface of the laser base, a thumb screw is tightened to frictionally secure the level in the base.

BRIEF DESCRIPTION OF THE DRAWINGS

FIG. 3 is a left side elevational view of the plumber's level shown in FIG. 1.

FIG. 4 is a right side elevational view of the plumber's level shown in FIG. 1.

FIG. 5 is a top plan view of the plumber's level shown in FIG. 1.

FIG. 6 is a bottom plan view of the plumber's level shown in FIG. 1.

FIG. 7 is an exploded front view, partly broken way to show internal construction of the plumber's level shown in FIG. 1.

FIG. 8 is a generally perspective, illustrative view showing the plumber's level of the invention being used to level a length of pipe with zero percent slope.

FIG. 9 is a generally perspective, illustrative view showing the plumber's level of the invention being used to level a length of pipe with a 1 percent slope.

FIG. 10 is a generally perspective, illustrative view showing the plumber's level of the invention being used to level a length of pipe with a 2 percent slope.

FIG. 11 is a generally perspective, illustrative view showing the plumber's level of the invention being used to level a length of pipe with a 3 percent slope.

SUMMARY OF THE INVENTION

Figure 1:
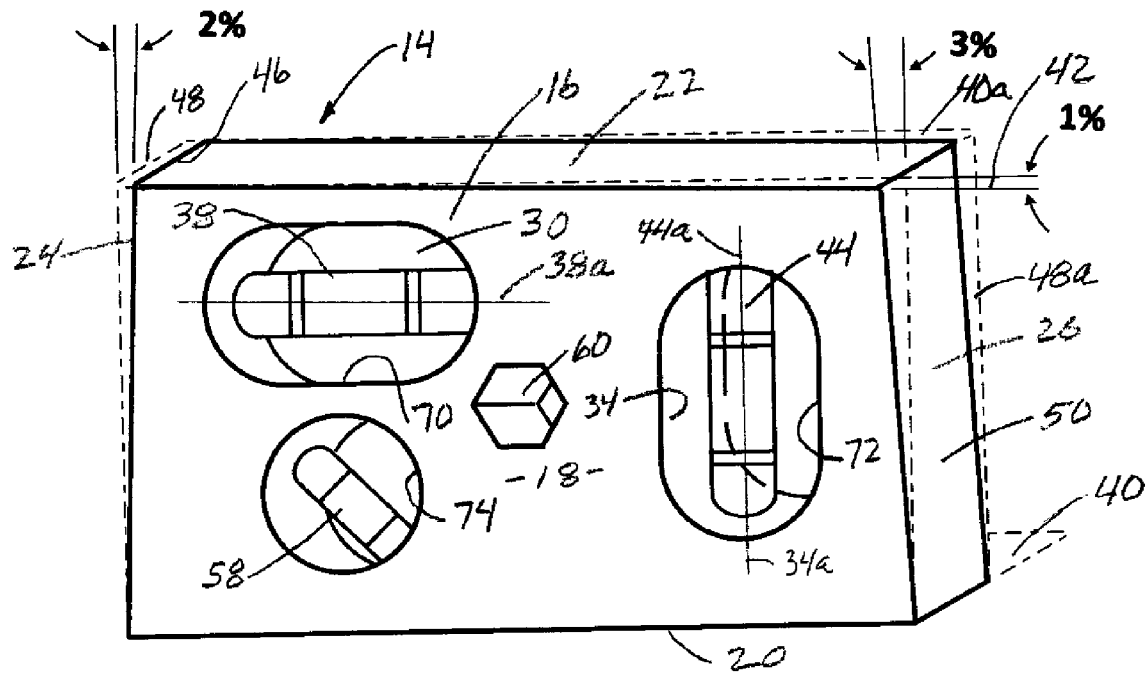
FIG. 1 is a generally perspective view of one form of the plumber's level of the present invention.

It is an object of the present invention to provide a spirit type level that may be used to plumb any vertical pole, post, or pipe, may be used to horizontally set an object and may also be used to quickly and easily set a pipe at a selected percent of slope to create a liquid flow at a desired slope.

It is another object of the invention to provide a spirit level of the aforementioned character that can be quickly and easily removably attached to the object to be leveled thereby freeing the hands of the user to position the object.

It is another object of the present invention to provide a spirit type level of the character described in the preceding paragraphs that includes a plurality of differently oriented spirit vials that are secured within the level body in a manner such that, if any one of the spirit vials become broken, or otherwise damaged, it can be easily replaced and the level need not be discarded.

Another object of the invention is to provide a spirit type level of the afore mentioned character in which the spirit vials are securely held in position within threaded chambers formed in the level body by easily removable threaded cap screws.

Still another object of the invention is to provide a spirit type level of the class described in which the various surfaces of the level are provided with a longitudinally extending, generally V-shaped groove that functions to precisely, longitudinally align the level with the longitudinal axis of cylindrical work pieces.

Still another object of the invention is to provide a spirit type level as described in the preceding paragraphs that includes a plurality of longitudinally spaced magnets that are connected to the various surfaces of the level so as to permit the level to be conveniently, removably connected to any ferrous structure that is being leveled.

These and other objects of the invention will be realized by the level construction illustrated in the drawings and described in the paragraphs that follow.

DESCRIPTION OF THE INVENTION

Referring to the drawings and particularly to FIGS. 1 through 7, one form of the level of the invention for determining the orientation of a structure is there shown and generally designated by the numeral 14. Level 14 here comprises a body 16 having a central portion 18 and first, second, third and fourth work piece engaging surfaces 20, 22, 24 and 26 respectively. As illustrated in FIGS. 3 through 6 of the drawings, in one form of the level of the invention each of the work piece engaging surfaces can be, provided with a longitudinally extending, generally "V" shaped groove designated in the drawings respectively as 20a, 22a, 24a and 26a. With this construction, when the level is used in conjunction with pipes and the like, such as is illustrated in FIGS. 8 through 11 of the drawings, the grooves will function to positively align the longitudinal axis of the level with the longitudinal axis of the pipe.

As depicted in FIG. 7 of the drawings, central portion 18 includes a first vial chamber 30 having an axial centerline 30a, a threaded opening 30b and a threaded connector, shown here as a threaded setscrew 32, that is removably mounted within the threaded opening and is adapted for rotational movement along the axial centerline 30a. Similarly, central portion 18 includes a second vial chamber 34 having a generally vertically extending, axial centerline 34a, a threaded opening 34b and a threaded connector, shown here as a threaded setscrew 36, that is removably mounted within the threaded opening and is adapted for rotational movement along the axial centerline 34a. Removably mounted within first vial chamber 30 is a first spirit vial 38 having a longitudinal center line 38a that is axially aligned with the axial centerline 30a of first vial chamber 30. As best seen by referring to FIG. 1, the first work piece engaging surface 20 of body 16 disposed within a generally horizontal reference plane 40 and the longitudinal center line 38a of the first spirit vial 38 resides in a first plane that is substantially parallel to horizontal reference plane 40.

For a purpose presently to be described, the second work piece engaging surface 22 of body 16 is uniquely disposed within a second plane 42 that extends downwardly at a first acute angle of approximately 1 percent with respect to a horizontal reference plane that is shown in FIG. 1 in dotted lines and designated as 40a. Reference plane 40a is substantially parallel to horizontal reference plane 40.

Figure 2:
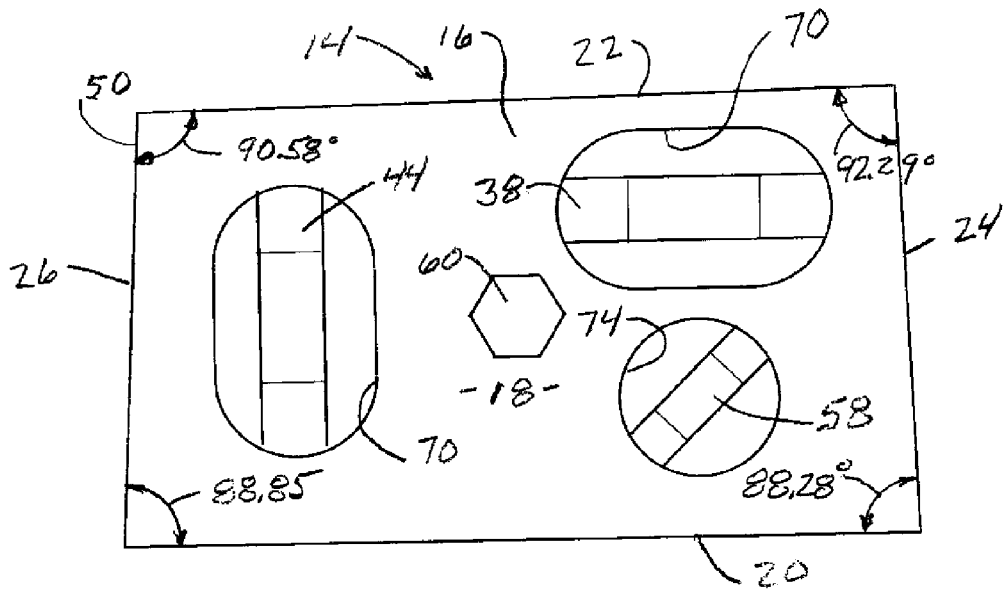
FIG. 2 is a rear view of the plumber's level shown in FIG. 1.

Removably mounted within second vial chamber 34 is a second spirit vial 44 having a longitudinal center line 44a that is axially aligned with the axial centerline 34a of second vial chamber 34 (see FIG. 7). As best seen by referring to FIG. 1, the third work piece engaging surface 24 of body 16 disposed within a third plane 46 that slopes inwardly at a second acute angle of approximately 2 percent with respect to a substantially vertical reference plane that is shown in FIG. 1 in dotted lines located proximate the left side of FIG. 1 and is identified as 48. As indicated in FIG. 1, the longitudinal center line 34a of the second vial 44 resides in a plane that is substantially parallel to substantially vertical reference plane 48. As indicated in FIG. 2, third work piece engaging surface 24 extends from the first work piece engaging surface 20 at an angle of approximately 88.28 degrees.

The fourth work piece engaging surface 26 of body 16 disposed within a fourth plane 50 that slopes inwardly at a third acute angle of approximately 3 percent with respect to a substantially vertical, reference plane that is shown in FIG. 1 in dotted lines located proximate the right side of FIG. 1 and is identified as 48a. Plane 48a is substantially parallel to substantially vertical reference plane 48. As indicated in FIG. 1, the longitudinal center line 34a of the second vial 44 resides in a plane that is substantially parallel to substantially vertical, reference plane 48 and by definition to plane 48a. As seen in FIG. 2 of the drawings, fourth work piece engaging surface 26 extends from first work piece engaging surface 20 at an angle of approximately 88.85 degrees. As also indicated in FIG. 2, second work piece engaging surface 22 extends from fourth work piece engaging surface 26 at an angle of approximately 90.58 degrees and extends from third work piece engaging surface 24 at an angle of approximately 92.29 degrees.

As depicted in FIG. 7 of the drawings, central portion 18 also includes a third vial chamber 54 having an axial centerline 54a, a threaded opening 54b and a threaded connector, shown here as a threaded setscrew 56, that is removably mounted within the threaded opening and is adapted for rotational movement along the axial centerline 54a. Removably mounted within third vial chamber 54 is a third spirit vial 58 having a longitudinal center line 58a that is axially aligned with the axial centerline 54a of third vial chamber 54. As illustrated in the drawings, the longitudinal centerline 58a of third spirit vial 58 extends at an angle of approximately 45 degrees with respect to work engaging surface 20 and with respect to first reference plane 40.

As previously discussed, with the level construction described in the preceding paragraphs, any one of the first, second and third spirit vials can be removed from the level and replaced by a new spirit vial by simply threadably removing the appropriate setscrew that holds the spirit vial in position and then removing the spirit vial from its vial chamber. Accordingly, if a given spirit vial is broken, or otherwise damaged, it can be easily replaced and the level need not be discarded. As depicted in the drawings, a rubber washer "R" is positioned between each setscrew and spirit vial to cushion the spirit vial and protecting it from breakage when the setscrew is tightened.

For a reason presently to be described, central portion 18 of body 16 is provided with a through aperture 60 that is adapted to removably receive an elastomeric connector mechanism 62 of the character illustrated in FIG. 8 of the drawings. Connector mechanism 62 here comprises an elongate elastomeric cord 64 and a cooperating securement member 66 which is carried by the intermediate portion of the elastomeric cord and, in a manner presently to be described, functions to secure the cord to the body 16 (FIG. 8). Elastomeric cord 64 includes a first end portion 64a that is connected to body 16 by means of a securement disk 68. Cord 64 also includes a second free end 64b and an intermediate portion 64c.

In using the level of the invention to orient a structure, such as a length of drainpipe "P", the level is first positioned in engagement with the pipe in the manner shown in FIG. 8 of the drawings so that the selected work piece engaging surface is in engagement with one side of the pipe. With the level in this position, the elastomeric cord 64 is fed through the aperture 60 and is wrapped around the pipe. Next, the spring loaded release button 66a of the securement member 66 is pressed inwardly so that the free end of the cord can be fed through the securement member opening 66b. This done, the cord is appropriately stretched and secured against the pipe and the release button is released to lock the cord in the securement position. With the securement cord thusly positioned, the level is held in secure engagement with the pipe so that the workman can use both hands to orient the pipe.

As illustrated in the drawings, body 16 is provided with a first viewing window 70 for viewing the first spirit vial 38 and second and third viewing windows 72 and 74 for viewing the second and third vials 44 and 58 respectively.

With this construction, the workman is accorded a clear view of the spirit vials so that the workpiece can be readily oriented in a manner well understood by those skilled in the art.

Referring once again to FIG. 8 of the drawings, when the first work piece engaging surface 20 of body 16 is positioned in engagement with the pipe in the manner shown in FIG. 8 of the drawings, vial axis 38a of the spirit vial 38 resides in a plane that is substantially parallel to the plane of first work piece engaging surface 20 of body 16. Accordingly, centering of the spirit vial 38 will indicate that the longitudinal axis of the pipe is horizontal, that is, is positioned with zero slope. However, when the level is inverted and the second work piece engaging surface 22 of body 16 is positioned in engagement with the pipe in the manner shown in FIG. 9, the vial axis 38a of the spirit vial 38 resides in a plane that extends at an acute angle of approximately 1 percent with respect to the plane of the second work piece engaging surface (see FIG. 1). Accordingly, in order for the bubble of the spirit vial 38 to be centered, the pipe "P" must be positioned at a slope of 1 percent with respect to the first reference plane horizontal. Therefore, centering of the bubble of the spirit vial 38 by the workman will automatically indicate that the longitudinal axis of the pipe is positioned with a slope of approximately 1 percent with respect to horizontal. It is to be understood that the level can be positioned on the pipe in the manner shown in FIG. 9, or alternatively can be secured to the pipe in the manner previously described using the elastomeric connector member 62.

When the level is rotated and the third work piece engaging surface 24 of body 16 is positioned in engagement with the pipe in the manner shown in FIG. 10, the vial axis 44a of the spirit vial 44 resides in a plane that extends at an acute angle of approximately 2 percent with respect to the plane of the third work piece engaging surface. Accordingly, in order for the bubble of the spirit vial 44 to be centered, the pipe "P" must be positioned at a slope of approximately 2 percent with respect to horizontal. Therefore, centering of the bubble of the spirit vial 44 by the workman will automatically indicate that the longitudinal axis of the pipe is positioned with a slope of approximately 2 percent with respect to horizontal. Once again, it is to be understood that the level can be positioned on the pipe in the manner shown in FIG. 10, or alternatively can be secured to the pipe in the manner previously described using the elastomeric connector member 62.

When the level is rotated so that the fourth work piece engaging surface 26 of body 16 is positioned in engagement with the pipe in the manner shown in FIG. 11, the vial axis 44a of the spirit vial 44 resides in a plane that extends at an acute angle of approximately 3 percent with respect to the plane of the fourth work piece engaging surface. Accordingly, in order for the bubble of the spirit vial 44 to be centered, the pipe "P" must be positioned at a slope of approximately 3 percent with respect to horizontal. Therefore, centering of the bubble of the spirit vial 44 by the workman will automatically indicate that the longitudinal axis of the pipe is positioned with a slope of approximately 3 percent with respect to horizontal. Once again, it is to be understood that the level can be positioned on the pipe in the manner shown in FIG. 11, or alternatively can be secured to the pipe in the manner previously described using the elastomeric connector member 62. Elastomeric connector member 62 is available from various sources including the Ching Lin Plastic Industry Company, Inc. of Tali City, Taichung Hsien, Taiwan, R.O.C.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. A spirit level comprising:
   (a) a body comprising a central portion defining an aperture;
   (b) a first work piece engaging surface defining a predetermined slope disposed within a first reference plane;
   (c) a second work piece engaging surface defining a predetermined slope spaced apart from said first work piece engaging surface and disposed within a plane extending at a first acute angle with respect to said first reference plane;
   (d) a third work piece engaging surface defining a predetermined slope and disposed within a plane extending at a second acute angle with respect to a second reference plane, said second reference plane extending substantially perpendicular to said first reference plane; and
   (e) a fourth work piece engaging surface defining a predetermined slope and disposed within a plane extending at a third acute angle with respect to said second reference plane.

2. The spirit level as defined in claim 1 in which each of said first, second, third and fourth work piece engaging surfaces is provided with a generally "V" shaped groove.

3. The level as defined in claim 2 in which said first acute angle is approximately 1 percent, in which said second acute angle is approximately 2 percent and in which said third acute angle is approximately 3 percent.

4. The level as defined in claim 2 further including a third spirit vial mounted within said central portion of said body.

5. The level as defined in claim 2 in which said body is provided with a generally centrally disposed through aperture.

6. The level as defined in claim 1 further including:
   (a) a first spirit vial mounted within said central portion of said body, said first spirit vial having a longitudinal center line disposed within a plane that is substantially parallel to said first reference plane; and
   (b) a second spirit vial mounted within said central portion of said body, said second spirit vial having a longitudinal center line disposed within a plane that is substantially parallel to said second reference plane.

7. A spirit level comprising:
   (a) a body comprising central portion defining an aperture;
   (b) a first work piece engaging surface defining a predetermined slope and disposed within a first reference plane;
   (c) a second work piece engaging surface defining a predetermined slope and disposed within a plane spaced apart from said first work piece engaging surface and extending at an angle of approximately 1 percent with respect to said first reference plane;
(d) a third work piece engaging surface defining a predetermined slope and disposed within a plane extending at an angle of approximately 88.28 degrees with respect to said first work piece engaging surface; and
(e) a fourth work piece engaging surface defining a predetermined slope and disposed within a plane extending at an angle of approximately 88.85 degrees with respect to said first work piece engaging surface.

8. The level as defined in claim 7 in which said second work piece engaging surface is disposed within a plane extending at an angle of approximately 92.29 degrees with respect to said third work piece engaging surface.

9. The level as defined in claim 7 further including:
(a) a first spirit vial mounted within said central portion of said body, said first spirit vial having a longitudinal center line disposed within a plane that is substantially parallel to said first reference plane;
(b) a second spirit vial mounted within said central portion of said body, said second spirit vial having a longitudinal center line disposed within a plane that is substantially perpendicular to said first reference plane; and
(c) a third spirit vial mounted within said central portion of said body.

10. The spirit level as defined in claim 9 in which said third spirit vial has a longitudinal center line extending at an angle of approximately 45 degrees with respect to said first reference plane.

11. The spirit level as defined in claim 9 in which each of said first, second, third and fourth work piece engaging surfaces is provided with a generally "V" shaped groove.

12. The spirit level as defined in claim 9 in which said central portion of said body is provided with a through aperture.

13. The spirit level as defined in claim 12 further including a connector for releasably connecting said spirit level to the work piece.

14. The spirit level as defined in claim 13 in which said connector comprises an elongated elastomeric member removably receivable within said aperture provided in said body.

15. A spirit level comprising:
(a) a body comprising a central portion defining an aperture;
(b) a first work piece engaging surface defining a predetermined slope and disposed within a first reference plane;
(c) a second work piece engaging surface defining a predetermined slope spaced apart from said first work piece engaging surface and disposed within a plane extending at a first acute angle with respect to said first reference plane;
(d) a third work piece engaging surface defining a predetermined slope and disposed within a plane extending at a second acute angle with respect to a second reference plane, said second reference plane extending substantially perpendicular to said first reference plane;
(e) a fourth work piece engaging surface defining a predetermined slope and disposed within a plane extending at a third acute angle with respect to said second reference plane;
(f) a first spirit vial mounted within said central portion of said body, said first spirit vial having a longitudinal center line disposed within a plane that is substantially parallel to said first reference plane; and
(g) a second spirit vial mounted within said central portion of said body, said second spirit vial having a longitudinal center line disposed within a plane that is substantially parallel to said second reference plane.

16. The level as defined in claim 15 in which said first acute angle is approximately 1 percent, in which said second acute angle is approximately 2 percent and in which said third acute angle is approximately 3 percent.

17. The level as defined in claim 15 further including a third spirit vial mounted within said central portion of said body.

18. The level as defined in claim 15 in which said body is provided with a generally centrally disposed through aperture.

19. The spirit level as defined in claim 15 in which each of said first, second, third and fourth work piece engaging surfaces is provided with a generally "V" shaped groove.

20. The level as defined in claim 15 further including a connector for releasably connecting said spirit level to the work piece.

* * * * *